Patented Nov. 19, 1940

2,222,482

UNITED STATES PATENT OFFICE 2,222,482

SULPHUR DYES

Walter Hagge, Wolfen, Kreis Bitterfeld, and Karl Haagen, Dessau in Anhalt, Germany, assignors to General Aniline & Film Corporation, New York, N. Y., a corporation of Delaware No Drawing. Application December 13, 1939, Serial No. 309,104. In Germany December 13, 1938

7 Claims. (Cl. 260—125)

The present invention relates to a process of preparing sulphur dyes and to the new products obtainable by this process.

We have found that on treating coronene (hexabenzobenzene, see "Berichte der Deutschen Chemischen Gesellschaft," vol. I, pages 902 et seq.) with sulphurizing agents there are obtained dyes which with the aid of alkali sulphides dissolve substantially completely in water; the solution thus obtained dyes cotton khaki-brown tints. The dyeings thus produced particularly have an excellent fastness to light besides other good fastness properties.

It is already known from U. S. Patent No. 2,076,143 to obtain dyes readily soluble in aqueous sodium sulphide solution by treating a polycyclic hydrocarbon, namely decacyclene, with a sulphurizing agent. They yield catechu-brown tints; they are, therefore, entirely different in shade from the dyes produced from coronene. The sulphur dyes obtainable according to the process described in French Patent No. 776,145 by treating polynuclear hydrocarbons with a sulphurizing agent generally show other shades or have a fastness to light inferior to that of the dyes produced from coronene.

With the known sulphur dyes from hydrocarbons it has hitherto been impossible to obtain dyeings in this tint by a direct dyeing process, that is without any further aftertreatment, from a sodium sulphide bath, which dyeings have such a good fastness to light as obtained with the dyes from coronene.

We have furthermore found that the substitution products of coronene, particularly the halogenation-, sulphonation- and nitration products thereof, may likewise be transformed in the same manner into sulphur dyes which, just as the dyes from the hydrocarbon itself, have an excellent fastness to light besides other good fastness properties.

The shades of the dyes obtained by using the sulphonic acids of coronene are only slightly different from those of the dye from hydrocarbon. The dyes, obtained from the halogen-substitution products, first produce, pari passu with the increase of the content of halogen, brighter red tints and then more covered brown tints.

As the formation of the dye is not limited to some and exactly defined substitution products and the number of substituents entered has only a relatively small action upon the shade, it is not necessary to prepare in a pure form the intermediate products used; they may be used as crude products. It is, of course, likewise possible, without impairing the good fastness properties, to treat mixtures of the intermediate products with a sulphurizing agent. Moreover, the sulphurizing conditions may be altered; benzidine and metallic salts may be added.

The following examples serve to illustrate the invention, but they are not intended to limit it thereto; the parts being by weight:

*Example 1.*—30 parts of coronene are introduced into 300 parts of fused sulphur and the mixture is heated to 280° C. In the course of about 8 hours the temperature of the fused mass is increased to 320° C. and the material is maintained at that temperature for about 12 hours. After cooling, the fused mass is ground and then decomposed with caustic soda solution and/or sodium sulphide; during this operation the melt is completely dissolved. The dye is separated in known manner from this solution. It dyes cotton greenish khaki tints. The dyeings have an excellent fastness to light besides other good fastness properties.

The formation of the dye is not limited to the temperatures named above. Higher or lower temperatures may also be applied, a longer or shorter duration of action being required thereby. A slight displacement of the tint may occur in that case.

If benzidine is added to the fused material there is obtained, at a sulphurizing temperature of 280° C. a dye which, in comparison with a dye prepared at the same temperature without the addition of benzidine, possesses a somewhat more yellow-green tint. If the dye prepared with an addition of benzidine is baked at a temperature of 320° C. a covered, dull shade is obtained, particularly if copper salts are added to the fused material.

The quantities of sulphur named may be varied to a large extent; sulphur may partly be replaced by sulphur monochloride.

*Example 2.*—30 parts of coronene and 150 parts of sulphur are introduced, while stirring, into 250 parts of sulphur monochloride and the mixture is heated in the course of about 6 to 8 hours to 200° C. The temperature of the fused material is then slowly raised to 320° C. and kept for about 12 hours at 320° C. The crude melt of the dye is worked up as described in Example 1. The sulphur dye obtained dyes cotton similar tints as the dye obtainable according to Example 1 and possesses the same good fastness properties.

*Example 3.*—50 parts of coronene are sulphurized with a polysulphide from 200 parts of crystallized sodium sulphide and 200 parts of sulphur in the following manner: The fused material is first slowly concentrated, the temperature is then raised finally to 320° C. and this temperature is maintained for about 8 hours. The crude melt obtained is dissolved in water by means of caustic soda solution or sodium sulphide. The dye is precipitated from the solution with the aid of air or acid. It dyes cotton similar tints as the dye obtained according to Example 1. The yield amounts to 110 parts of dye.

It is not absolutely necessary to heat the fused material to 320° C. because the dye is formed already at a temperature below 300° C.; on baking at 280° C. similar dyes are obtained, however, in a somewhat inferior yield.

*Example 4.*—80 parts of dibromocoronene, obtained by the action of bromine in a slight excess on coronene in tetrachloroethane at 20° C. to 60° C., are heated together with 450 parts of sulphur in the course of 4 hours from 200° C. to 280° C. and then for further 6 hours from 280° C. to 320° C. The fused material is then baked for about 18 hours at 320° C. and allowed to cool. There are obtained about 300 parts of crude melt of the dye which is decomposed with caustic soda solution and/or sodium sulphide; during this operation it dissolves substantially completely. The dye separated in known manner from the solution dyes cotton similar tints as the dyes prepared according to Examples 1 and 2 from coronene and possesses the same fastness properties.

*Example 5.*—50 parts of coronene are treated in 350 parts by volume of ortho-dichlorobenzene at 35° C. with chlorine which has been prepared from 200 parts of chloride of lime of 74 per cent. strength with hydrochloric acid. After the chlorine has been introduced, the whole is filtered with suction; there are thus obtained 59 parts by weight of a residue which consists nearly entirely of pentachlorocoronene sparingly soluble in dichlorobenzene. The solvent is distilled with steam; from the lye about 23 parts of a higher-chlorinated product are obtained which is readily soluble in dichlorobenzene and constitutes an enneachlorocoronene.

The two chlorination products are heated without any further purification with five times their weight of sulphur in the course of 8 hours to 320° C. and then baked for about 12 hours at 320° C. The two crude melts of the dye are dissolved by decomposing them with sodium sulphide. The dyes are separated from the solutions in the usual manner. The sulphur dye obtained from pentachlorocoronene dyes cotton clear khaki tints. With the aid of the dye from the higher chlorination product of coronene there are obtained dyeings of a similar but somewhat more covered tint. The dyeings have a particularly good fastness to light besides other good fastness properties.

*Example 6.*—Sulphonic acid obtained by the action of 3 mol of chlorosulphonic acid on 1 mol of coronene is neutralized with caustic soda solution, evaporated while adding 1350 parts of sulphur and 2700 parts of crystallized sodium sulphide and heated in the course of 6 hours from 160° C. to 310° C. The crude melt obtained after heating for about 15 hours to 310° C. to 320° C. is decomposed in the usual manner with sodium sulphide and the dye is precipitated from the solution by means of acid. The yield of dye having a good strength amounts to about 900 parts. It dyes cotton khaki tints of a somewhat duller red than the dye described in Examples 1 and 2.

*Example 7.*—Sulphonic acid obtained by the action of 6 mol of chlorosulphonic acid on 1 mol of coronene is neutralized as described in the preceding example, evaporated while adding 1590 parts of sulphur and 3180 parts of crystallized sodium sulphide and slowly heated to 310° C. to 320° C. The crude melt of the dye is worked up in the same manner as described in the preceding example. There are obtained 1110 parts of a dye having a good strength. It dyes tints similar to those of the dye described in the preceding example.

*Example 8.*—144 parts of trinitrocoronene, obtained from 100 parts of coronene by nitration with nitric acid of about 80 per cent. strength at 20° C., are introduced into a polysulphide solution prepared from 290 parts of sulphur and 500 parts of crystallized sodium sulphide. The mixture is concentrated by gradually distilling water. The temperature is raised within several hours to 280° C. and the whole is baked for about 12 hours at this temperature. The product obtained is then introduced into a solution of 1000 parts by weight of crystallized sodium sulphide and 680 parts of concentrated caustic soda solution of 35° Bé. The whole is heated for some time to 190° C. to 200° C., while distilling water and about 910 parts of crude melt of the dye are then obtained which dissolves in water without the formation of any residue and which, without any further purification, may be used as sulphur dye. It dyes cotton olive-brown tints.

*Example 9.*—188 parts of hexanitrocoronene obtained by nitrating 100 parts of coronene with anhydrous nitric acid at 20° C., are heated for several hours in a reflux condenser together with a polysulphide solution prepared from 375 parts of sulphur and 1500 parts of crystallized sodium sulphide. The temperature of the fused material is then slowly raised to 180° C. while separating the water by distillation and maintained for about 15 hours at 180° C. There are obtained about 1000 parts of crude melt of the dye which is dissolved in water. A small quantity of residue insoluble in aqueous sodium sulphide solution is removed from the solution by filtering with suction and the dye is precipitated with acid. There are obtained 200 parts of a dye having a good strength. It dyes cotton black-brown tints.

It is obvious that our invention is not limited to the foregoing examples or to the specific details given therein. Thus, the sulphurizing conditions may be varied, and as sulphurizing agents there may be used, for instance, sulphur chloride or molten sulphur.

By varying the temperatures maintained during the sulphurizing process, the tints of the dyes may be also varied as indicated in the examples.

The sulphurizing process may be carried out in the presence of heavy metal salts, such as copper-, nickel- or molybdenum salts. All these variations are well known in the art and are intended to be in the scope of the claims following hereafter.

What we claim is:

1. The process for manufacturing new sulphur dyes which comprises heating a polynuclear compound of the group consisting of coronene, halogeno coronene, coronene sulphonic acid and nitrocoronenes together with a sulphurizing agent to the reaction temperature.

2. The process for manufacturing new sulphur dyes which comprises heating a polynuclear compound of the group consisting of coronene, halogeno coronene, coronene sulphonic acids and nitrocoronenes together with a sulphuring agent to the reaction temperature in the presence of benzidine.

3. The process for manufacturing new sulphur dyes which comprises heating a polynuclear compound of the group consisting of coronene, halogeno coronene, coronene sulphonic acids and nitrocoronenes together with a sulphurizing agent to the reaction temperature in the presence of a metallic salt of the group consisting of copper-, nickel-, cobalt- and molybdenum salts.

4. The process for manufacturing new sulphur dyes which comprises heating a polynuclear compound of the group consisting of coronene, halogeno coronene, coronene sulphonic acids and nitrocoronenes together with sodium polysulphide to the reaction temperature.

5. The process for manufacturing new sulphur dyes which comprises heating a polynuclear compound of the group consisting of coronene, halogeno coronene, coronene sulphonic acid and nitrocoronenes together with sodium polysulphide to the reaction temperature in the presence of benzidine.

6. The process for manufacturing new sulphur dyes which comprises heating a polynuclear compound of the group consisting of coronene, halogeno coronene, coronene sulphonic acids and nitrocoronenes together with sodium polysulphide to the reaction temperature in the presence of a metallic salt of the group consisting of copper-, nickel-, cobalt- and molybdenum salts.

7. The sulphur dyes obtainable according to claim 1, said dyes dyeing cotton khaki tints.

WALTER HAGGE.
KARL HAAGEN.